(12) United States Patent
Warintarawat

(10) Patent No.: US 9,968,867 B2
(45) Date of Patent: May 15, 2018

(54) SEPARATOR SYSTEM, A PARTICULATE-DISCHARGING SUBSYSTEM FOR USE IN SEPARATOR SYSTEMS, AND METHODS OF AND PROCESSES FOR SEPARATING COMPONENTS OF AN INPUT MIXTURE USING A PARTICULATE DISCHARGING SUBSYSTEM IN A SEPARATOR SYSTEM

(71) Applicant: PTT EXPLORATION AND PRODUCTION PUBLIC COMPANY LIMITED, Bangkok (TH)

(72) Inventor: Somchai Warintarawat, Bangkok (TH)

(73) Assignee: PTT Exploration and Production Public Company Limited, Bangkok (TH)

( * ) Notice: Subject to any disclaimer, the term of this patent is extended or adjusted under 35 U.S.C. 154(b) by 395 days.

(21) Appl. No.: 14/924,582

(22) Filed: Oct. 27, 2015

(65) Prior Publication Data

US 2017/0113232 A1 Apr. 27, 2017

(51) Int. Cl.
*B01D 21/24* (2006.01)

(52) U.S. Cl.
CPC ....... *B01D 21/2472* (2013.01); *B01D 21/245* (2013.01)

(58) Field of Classification Search
CPC .......................... B01D 21/2472; B01D 21/245
See application file for complete search history.

(56) References Cited

U.S. PATENT DOCUMENTS 4,519,907 A * 5/1985 Rooney ................ B01D 21/267
209/169

* cited by examiner

*Primary Examiner* — David A Reifsnyder
(74) *Attorney, Agent, or Firm* — Baker & McKenzie LLP

(57) ABSTRACT

Example embodiments relate to a separator system comprising a compartment body defining an interior cavity, the interior cavity formed by interior walls of the compartment body. The separator system may further comprise an input section operable to receive an input mixture for housing in the interior cavity. The separator system may further comprise an output section. The separator system may further comprise a particulate-directing subsystem. The particulate-directing subsystem may comprise a disturbance assembly arranged along at least a bottom portion of the interior cavity. The disturbance assembly may comprise at least one rotary member operable to rotate in a first rotary direction and a second rotary direction. The particulate-directing subsystem may further comprise a discharge assembly arranged proximate to the output section. The discharge assembly may be configured so as to encourage particulates of the input mixture present in the interior cavity to pass through the output section.

28 Claims, 5 Drawing Sheets

SEPARATOR SYSTEM, A PARTICULATE-DISCHARGING SUBSYSTEM FOR USE IN SEPARATOR SYSTEMS, AND METHODS OF AND PROCESSES FOR SEPARATING COMPONENTS OF AN INPUT MIXTURE USING A PARTICULATE DISCHARGING SUBSYSTEM IN A SEPARATOR SYSTEM

BACKGROUND

The present disclosure relates generally to a separator system, a particulate-discharging subsystem for use in separator systems, and methods of and processes for separating components, including particulates, from an input mixture using a separator system and a particulate-discharging subsystem in a separator system.

Today, extractions of various desired chemicals, such as hydrocarbons, will generally be extracted in the form of a mixture of various different liquids, gases, and particulates, such as sand. In order to separate desired components from such raw mixtures, a separator system operable to perform a separation process is typically employed.

BRIEF SUMMARY

It is recognized in the present disclosure that separator systems, including those described in the present disclosure, typically encounter problems when and/or as a result of separating desired components from an input raw mixture. For example, particulates will generally remain in the separator compartment after the separation of desired components, and such remaining particulates will generally build up and pack together in the separator compartment over time. Such build up of particulates will eventually become very difficult to remove.

It is further recognized in the present disclosure that additional or compounded problems may result from such build up of particulates over time. For example, corrosion and/or pitting of the bottom surface and/or side walls of the interior of the separator compartment, as well as reductions in thickness, strength, and/or useful life of the separator system may occur over time as a result.

Present example embodiments relate generally to systems, apparatuses, and processes for separating particulates from an input mixture.

In an exemplary embodiment, a separator system is described. The separator system may comprise a compartment body defining an interior cavity. The interior cavity may be formed by interior walls of the compartment body. The separator system may further comprise an input section formed in the compartment body. The input section may be operable to receive an input mixture for housing in the interior cavity. The separator system may further comprise an output section formed in the compartment body. The separator system may further comprise a particulate-directing subsystem provided in the interior cavity. The particulate-directing subsystem may comprise a disturbance assembly fixedly secured to the compartment body and arranged along at least a bottom portion of the interior cavity. The disturbance assembly may comprise at least one rotary member operable to rotate in a first rotary direction and a second rotary direction opposite to the first rotary direction. The particulate-directing subsystem may further comprise a discharge assembly fixedly secured to the compartment body and arranged proximate to the output section. The discharge assembly may be configured so as to encourage particulates of the input mixture present in the interior cavity to pass through the output section.

In another exemplary embodiment, a particulate-directing subsystem for use in a separator system is described. The particulate-directing subsystem may be operable for use in a separator system. The separator system may comprise a compartment body, an input section, and an output section. The compartment body may define an interior cavity for housing an input mixture. The input section may be formed in the compartment body. The input section may be operable to receive the input mixture into the interior cavity. The output section may be formed in the compartment body. The output section may be operable to separate particulates from the input mixture. The particulate-directing subsystem may comprise a disturbance assembly provided in a bottom portion of the interior cavity and fixedly secured to the compartment body. The disturbance assembly may comprise at least one rotary member operable to rotate in a first rotary direction and a second rotary direction opposite to the first rotary direction. The particulate-directing subsystem may comprise a discharge assembly fixedly secured to the compartment body and arranged proximate to the output section. The discharge assembly may be configured so as to encourage particulates of the input mixture present in the interior cavity to pass through the output section.

In another exemplary embodiment, a particulate-directing subsystem for use in a separator system is described. The particulate-directing subsystem may be operable for use in a separator system. The separator system may comprise a compartment body, an input section, and an output section. The compartment body may define an interior cavity for housing an input mixture. The input section may be formed in the compartment body and operable to receive the input mixture into the interior cavity. The output section may be formed in the compartment body and operable to separate particulates from the input mixture. The particulate-directing subsystem may comprise a disturbance assembly provided in a bottom portion of the interior cavity and fixedly secured to the compartment body. The disturbance assembly may comprise at least one rotary member operable to rotate in a first rotary direction and a second rotary direction opposite to the first rotary direction. The particulate-directing subsystem may further comprise a controller operable to control rotary direction and speed of the at least one rotary member of the disturbance assembly. The particulate-directing subsystem may further comprise a detector for detecting a suspension height of particulates in the input mixture present in the interior cavity. The controller may be operable to control the suspension height of the particulates by controlling the rotary direction and/or speed of the at least one rotary member.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements in the figures for convenience, it can be appreciated that each of the various example embodiments may be considered to be distinct variations.

Figure 1A:
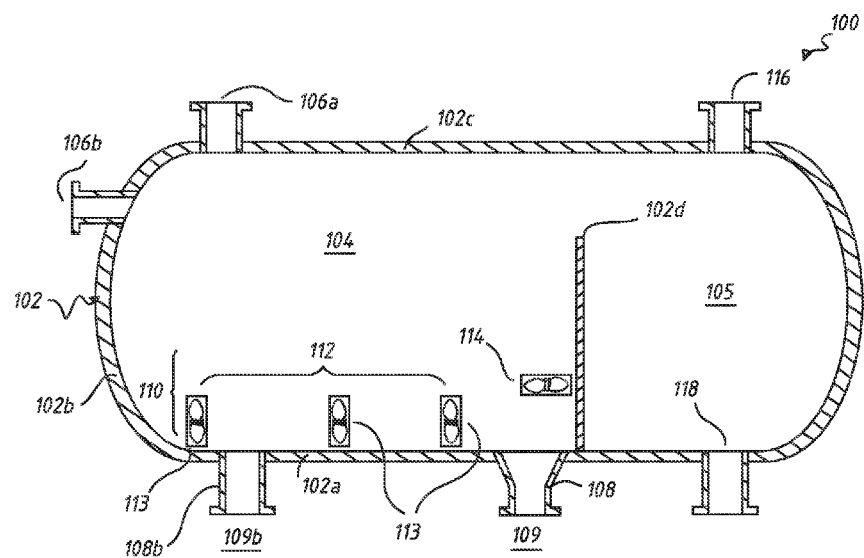
FIG. 1A is a cross-sectional illustration of an example embodiment of a separator system.

Example embodiments will now be described with reference to the accompanying drawings, which form a part of the present disclosure and which illustrate example embodiments which may be practiced. As used in the present disclosure and the appended claims, the terms "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and the appended claims, the words "and/or" may refer to and encompass any and all possible combinations of one or more of the associated listed items.

DETAILED DESCRIPTION

A separator system will typically be purposively built to comprise, among other things, an input receiving section for receiving extracted raw mixtures, a separator compartment for housing the extracted raw mixtures received by the receiving section, and at least one output section for allowing desired components in the raw mixture to be removed (separated) from the raw mixture. For example, an extracted raw mixture may include desired chemicals in solid, liquid, and/or gaseous form, such as hydrocarbons, and the raw mixture may also include other undesired liquids (such as water), gases, and/or particulates (such as fine sand particles). Due to inherent physical characteristic (such as density) variations between components of the raw mixture (such as between liquids, between liquids and solids, and between solids, as generally known to persons of ordinary skill in the art), when the raw mixture is received and housed in a separator compartment, the desired chemicals may settle as a separate layer above (or below) the undesired liquids, and the undesired liquids may settle as a separate layer above the particulates. In such an example, the output section may be provided at a specific distance from a bottom surface of the separator compartment so as to allow the layer of desired chemicals to flow through (such as via a weir plate) and therefore be separated from the rest of the raw mixture.

It is recognized in the present disclosure that separator systems, including those described above, may typically encounter problems when performing separation processes of extracted raw mixtures. For example, some particulates, such as fine sand particles, present in the raw mixture will generally settle to a bottom surface of the separator compartment and remain in the separator compartment even after the separation of the desired components (such as hydrocarbons) and removal of the other components of the raw mixture (such as the water and some of the particulates). To maximize the operational time and usage of separation systems, internal cleaning of separator compartments are generally not performed very often or routinely. Furthermore, internal cleaning of separator compartments is generally very time consuming and requires extensive manual and/or mechanical efforts. As a result, such remaining fine sand particles will build up and pack together on or about the bottom and sides of the separator compartment over time. Such build up of the fine sand particles will eventually become very difficult to remove, and will generally require very extensive manual and/or mechanical efforts, including scraping, applying high pressured gas or liquid streams, and/or applying high temperature liquid (such as water), to remove the built up and packed together fine sand particles.

It is further recognized in the present disclosure that additional and more severe problems may result from such build up of particulates (such as fine sand particles). For example, corrosion and/or pitting of a bottom surface and/or side walls of the separator compartment, as well as reductions in thickness, strength, and/or useful life of the separator system, may occur as a result of the build up of particulates. Such additional problems may result in a total shutdown of the separator system for internal cleaning and/or the undergoing of extensive repair and/or replacement of portions of the separator compartment (or the entire separator compartment and/or system) that have been damaged.

Present example embodiments relate generally to systems, apparatuses, and processes for separating particulates from an extracted raw mixture, and in particular, to improved separator systems and subsystems within separator systems, as well as improved processes for separating particulates from extracted raw mixtures.

As illustrated in FIG. 1A, an example embodiment of a separator system 100 may be operable to receive an input mixture and separate, among other things, particulates from the input mixture. The separator system may comprise a compartment body 102. The compartment body 102 may define at least an interior cavity 104, and the interior cavity 104 may be formed in one or more of a plurality of shapes and volumes, including, but not limited to, circular/spherical shapes and volumes, oval shapes and volumes, triangular/conical/pyramidal shapes and volumes, square/cubical shapes and volumes, rectangular/elongated cubical shapes and volumes, other geometrical shapes and volumes, and combinations of these and other shapes and volumes.

In example embodiments, the compartment body 102 may define more than one interior cavity, such as interior cavities 104 and 105. The interior cavity 104 may be formed by interior walls of the compartment body 102, including one or more bottom walls 102a having a bottom surface, side walls 102b having side wall surfaces, and one or more top walls 102c. In example embodiments, the interior cavity 104 may be formed by and/or include intermediate walls 102d, such as one or more weir plates 102d, and other subsystems and/or components provided in the interior cavity 104.

The separator system 100 may comprise at least an input section 106 formed in the compartment body 102. The input section 106 may be an opening, valve, connector, or the like, operable to receive an input mixture for housing in the interior cavity 104 of the compartment body 102. The input section 106 may be connectable to a pipe, valve, connector, channel, tank, compartment, or the like, which carries the input mixture to the input section 106. The input section 106 may be operable to allow two-way and/or only one-way flow of input mixture. In respect to the latter, the input section 106 may be operable to allow only input mixtures to enter the interior cavity 104 through the input section 106 but generally prevent the input mixture from exiting the interior cavity 104 through the input section 106. The input section 106 may also be operable to selectively allow certain input mixtures or certain components of input mixtures to enter into the interior cavity 104, but generally prevent certain input mixtures or certain components of input mixtures from entering into the interior cavity 104 through the input section 106. For example, the input section 106 may be operable to allow liquids, gases, and small particulates (such as fine sand particles) to enter into the interior cavity 104, but generally prevent larger particulates, such as rocks and other larger sediments, from entering into the interior cavity 104.

The input section 106 may be formed in one or more of a plurality of portions or locations in the compartment body 102. For example, the input section 106 may be formed on an upper portion of a side wall 102b of the compartment body 102. As another example, the input section 106 may be formed on a portion of a top wall 102c of the compartment body 102. As another example, the compartment body 102 may be created by opening a door (not shown), or the like, and such opening (such as a door) may be considered as the input section 106 in example embodiments.

It is to be understood in the present disclosure that more than one input section 106 may be formed in the compartment body 102 in example embodiments. For example, a first input section 106a may be formed on a first upper portion of a side wall 102b of the compartment body 102 and a second input section 106b may be formed on a top wall 102c of the compartment body 102. The first input section 106a may receive input mixtures from a first source, and the second input section 106b may receive input mixtures from a second source or the first source. The first source may be the same as or different from the second source.

The input section 106 may be formed in one or more of a plurality of shapes, including, but not limited to, circular shapes, oval shapes, triangular shapes, square shapes, rectangular shapes, other geometrical shapes, and combinations of shapes. The input section 106 may be formed in one or more of a plurality of sizes. For example, the input section(s) 106 may be circular in shape having a diameter of 2 to 36 inches and/or square in shape having sides of 2 to 36 inches.

When the separator system 100 comprises more than one input section 106, the input sections 106 may be formed adjacent to each other or on different side walls 102b (such as opposing or adjacent side walls). It is to be understood in the present disclosure that two or more different input mixture sources may provide input mixtures to one or more than one input section 106 without departing from the scope of the present disclosure.

The separator system 100 may further comprise an output section 108 formed in the compartment body 102. The output section 108 may be an opening, valve, connector, or the like, operable to allow one or more components of the input mixture present in the interior cavity 104 to leave (or be separated or discharged from) the interior cavity 104. The output section 108 may be connectable to a pipe, valve, connector, channel, tank, storage compartment, or the like. The output section 108 may be operable to allow two-way and/or only one-way flow of components of the input mixture. In respect to the latter, the output section 108 may be operable to allow components of the input mixture to leave (or separate or discharge from) the interior cavity 104 through the output section 108 but generally prevent components of the input mixture from entering (or re-entering) the interior cavity 104 through the output section 108. For example, the output section 108 may be operable to selectively allow particulates of the input mixture to leave (or separate or discharge from) the interior cavity 104 but generally prevent particulates of the input mixture from entering (or re-entering) into the interior cavity 104.

The output section 108 may be formed in one or more of a plurality of portions or locations in the compartment body 102. For example, the output section 108 may be formed on a lower portion of a side wall 102b of the compartment body 102 (not shown). As another example, the output section 108 may be formed on a bottom wall 102a of the compartment body 102.

It is to be understood in the present disclosure that more than one output sections 108 may be formed in the compartment body 102 in example embodiments. For example, a first output section 108 may be formed on a first portion of a bottom wall 102a of the compartment body 102 and a second output section 108b may be formed on a second portion of a bottom wall 102a of the compartment body 102. The first output section 108 may provide (or separate or discharge) particulates of the input mixture to a first storage source 109, and the second output section 108b may provide (or separate or discharge) particulates of the input mixture to a second source 109b or the first source 109. In some example embodiments, the first output section 108 may be provided for larger particulates and the second output section 108b may be provided for smaller particulates.

The output section 108 may be formed in one or more of a plurality of shapes, including, but not limited to, circular shapes, oval shapes, triangular shapes, square shapes, rectangular shapes, other geometrical shapes, and combinations of shapes. The output section 108 may be formed in one or more of a plurality of sizes. For example, the output section 108 may be circular in shape having a diameter of 2 to 20 inches and/or square in shape having sides of 2 to 20 inches.

When the separator system 100 comprises more than one output section 108, the output sections may be formed adjacent to each other or on different walls (such as different portions of the bottom wall 102a or on lower portions of opposing or adjacent side walls 102b). It is to be understood in the present disclosure that two or more different output sections 108 may discharge components of the input mixture to one or more than one storage compartment 109 without departing from the teachings of the present disclosure.

The separator system 100 may further comprise one or more gas outlet sections 116, pressure relief valve sections (not shown), and/or feedback gas sections (not shown). In example embodiments, the one or more gas outlet sections 116 may be operable to allow separated gaseous components of the input mixture to be removed from the interior cavity 104. Although not shown in the figures, it is to be understood in the present disclosure that a portion of the separated gaseous components (such as those removed using the gas outlet sections 116) may be used to drive the separator system 100 (such as the particulate-directing subsystem 110, as further described below and herein). For example, the separated gaseous components may be operable to drive a pneumatic motor (not shown) of the disturbance assembly 112 (described below and herein) and/or discharge assembly 114 (described below and herein) of the particulate-directing subsystem 110 (described below and herein) in example embodiments. Alternatively or in addition, one or more feedback gas sections and/or pressure relief valve sections may be provided to obtain gaseous components from the interior cavity 104 for use in driving the particulate-directing subsystem 110 and parts thereof.

Each of the gas outlet sections 116, pressure relief valve sections, and feedback gas sections may be formed in one or more of a plurality of shapes, including, but not limited to, circular shapes, oval shapes, triangular shapes, square shapes, rectangular shapes, other geometrical shapes, and combinations of shapes. Each of the gas outlet sections 116, pressure relief valve sections, and feedback gas sections may be formed in one or more of a plurality of sizes. For example, each of the gas outlet sections 116, pressure relief valve sections, and feedback gas sections may be circular in shape having a diameter 2 to 32 inches and/or square in shape having sides of 2 to 32 inches.

The separator system 110 may further comprise a separated outlet section 118 for use in removing liquid components, such as hydrocarbons, separated from the input mixture housed in the interior cavity 104 and/or 105. For example, liquid components, such as hydrocarbons, removed from the input mixture using a weir plate 102*d*, or the like, may be housed in a section defined by interior cavity 105, and such separated liquid components may be removed from the interior cavity 105 (or 104) using one or more separated outlet sections 118.

Each separated outlet section 118 may be formed in one or more of a plurality of shapes, including, but not limited to, circular shapes, oval shapes, triangular shapes, square shapes, rectangular shapes, other geometrical shapes, and combinations of shapes. Each separated outlet section 118 may be formed in one or more of a plurality of sizes. For example, each separated outlet section 118 may be circular in shape having a diameter 2 to 20 inches and/or square in shape having sides of 2 to 20 inches.

Although illustrated in the figures as having one or two input sections 106 (and 106*a* and 106*b*), one or two output sections 109 (and 109*b*), a single gas outlet section 116, a single separated outlet section 118, a single weir plate 102*d*, a single main interior cavity 104, another cavity 105 having a separated section for housing separated liquid components of the input mixture (such as hydrocarbons), it is to be understood in the present disclosure that other quantities of such components are contemplated in example embodiments without departing from the scope of the present disclosure.

The separator system 100 may further comprise a particulate-directing subsystem 110 for use in performing, among other things, a directing of particulates present in an input mixture in one or more of a plurality of directions when the input mixture is received and housed in the interior cavity 104 of the compartment body 102. In example embodiments, the particulate-directing subsystem 110 may be considered as creating or causing an undercurrent or disturbance or turbulence within the input mixture. In example embodiments, the particulate-directing subsystem 110 may be operable to perform such directing of particulates in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture; concentration of particulates present in the input mixture at a given time; amount of particulates removed or discharged from output section 108; etc.), and/or the like. The particulate-directing subsystem may be provided, in part or in whole, within the interior cavity 104 of the compartment body 102 of the separator system 100.

The particulate-directing subsystem 110 may comprise a disturbance assembly 112. The disturbance assembly 112 may be for use in, among other things, causing a disturbance in the input mixture and/or directing components in the input mixture, such as particulates, to or towards the output section 108.

The disturbance assembly 112 may be secured to or integrated with the compartment body 102. That is, the disturbance assembly 112 may be irremovably secured to the compartment body 102 or removably securable to the compartment body 102. In respect to the latter, the disturbance assembly 112 (and, in example embodiments, the entire particulate-directing subsystem 110) may be uninstalled, reconfigured, and/or portably removed for installation in another compartment body 102 of the separator system 100 or another separator system (not shown).

In example embodiments, the disturbance assembly 112 may be arranged along a bottom portion of the interior cavity 104. For example, the disturbance assembly 112 may be installed or secured to a bottom wall 102*a* of the compartment body 102 using anchors 113', as illustrated in FIG. 1B, and/or to a portion of one or more side walls 102*b* and/or 102*d* of the compartment body 102 using anchors 113", as illustrated in FIG. 1C.

The disturbance assembly 112 may comprise a rotary member 113 and/or any other device 113 operable to cause disturbance in the input mixture and/or direct components in the input mixture, such as particulates, in one or more directions. The rotary member 113 may resemble a propeller, fan, turbine, or the like, and may have one or more than one elongated member, such as a vane or blade, as the rotating member of the rotary member 113 that rotates about or around a centerline axis of rotation X. Each vane or blade may be formed in one or more of a plurality of shapes and sizes. For example, each vane or blade may has diameter 2 to 24 inches in length. The rotary member 113 may be operable to rotate at a speed of between 50 to 100 PPM.

Figure 1B:
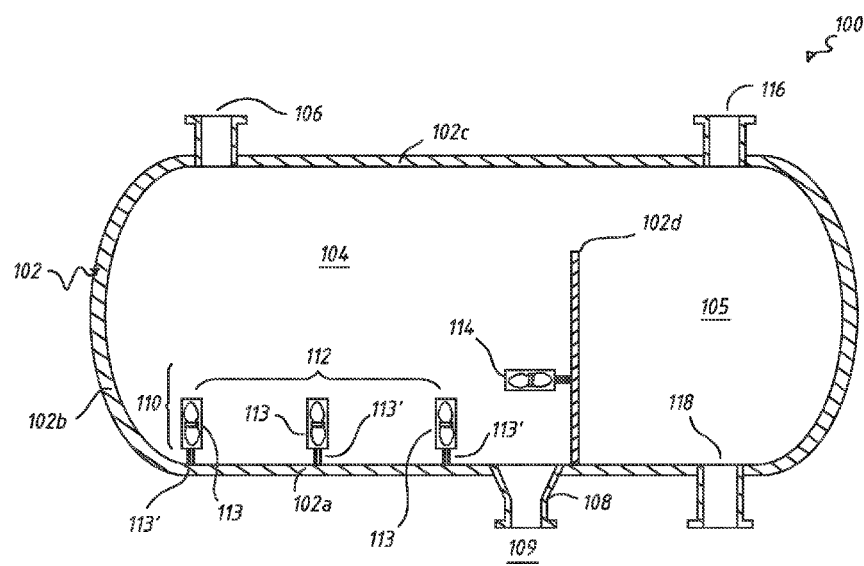
FIG. 1B is a cross-sectional illustration of an example embodiment of a separator system having a disturbance assembly secured to a bottom wall of a compartment body.
Figure 1C:
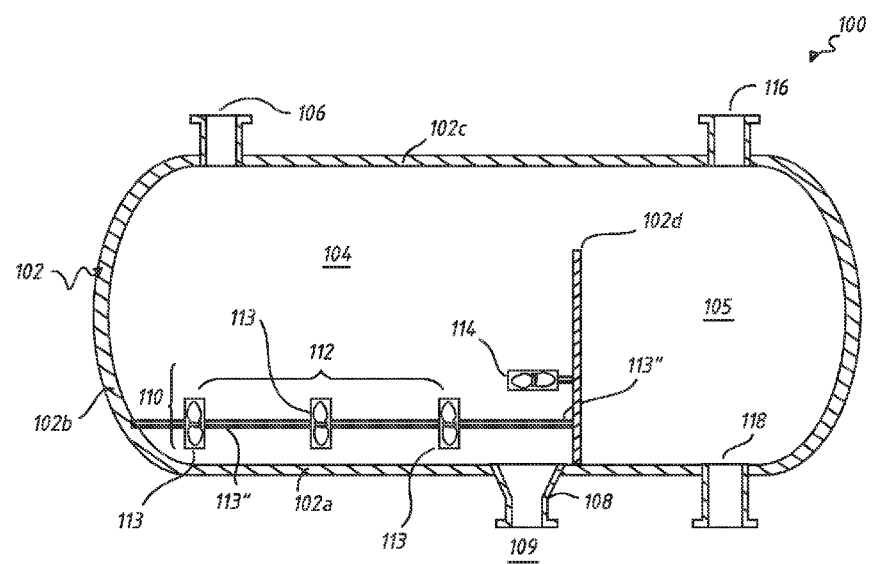
FIG. 1C is a cross-sectional illustration of an example embodiment of a separator system having a disturbance assembly secured to a side wall of a compartment body.

Although the separator system 100 is illustrated in FIGS. 1A-C as having three rotary members 113 arranged in a line, it is to be understood in the present disclosure that other quantities and arrangements/configurations of rotary members 113 are contemplated in example embodiments without departing from the scope of the present disclosure.

Figure 1D:
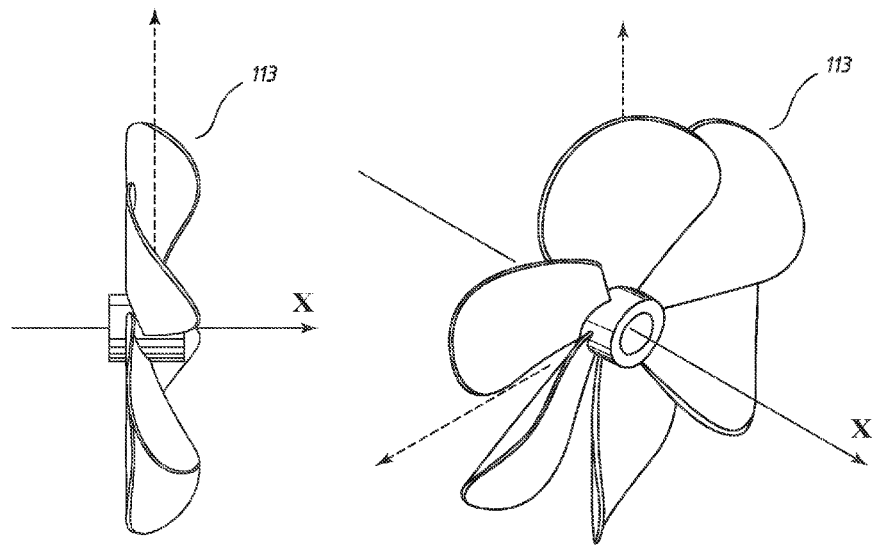
FIG. 1D is an illustration of a centerline axis of rotation of a rotary member of a disturbance assembly.

An example centerline axis of rotation X of a rotary member 113 of a disturbance assembly 112 is illustrated in FIG. 1D. The rotary member 113 may be positioned in such a way that a centerline axis of rotation X of the rotary member 113 is directed towards the output section 108 (or one of the output sections when there are more than one output sections). In example embodiments, a position and orientation (i.e., centerline axis of rotation), as well as the rotation, of the rotary member 113 may be controllable and selectable, either in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture and concentration of particulates of present input mixture; amount of particulates removed or discharged from output section 108, etc.), and/or the like. In example embodiments, the rotary member 113 may comprise two or more than two vanes or blades.

In example embodiments, the disturbance assembly 112 may comprise a plurality (or array) of rotary members 113. An arrangement of the plurality or array of rotary members 113 may be based on, among other things, the dimensions and shape/volume of the compartment body 102, interior cavity 104, and walls 102a, 102b, 102c, 102d of the compartment body 102; the location(s) of the one or more output sections 108; the location(s) of the one or more input sections 106; the positioning/orientation of the overall particulate-directing subsystem 110; the input mixture; and/or rate of output or separation of components of the input mixture. In example embodiments, one or more rotary members 113 may be positioned in such a way that a centerline axis of rotation X of the rotary member 113 is directed towards the output section 108 (or one of the output sections when there are more than one output sections). Adjacent or consecutive rotary members 113 may be separated by a distance of 30 to 200 cm in example embodiments.

In example embodiments, one or more rotary members 113 may be positioned in such a way that a centerline axis of rotation X of the rotary member 113 is directed towards another one of the rotary members 113. For example, a first rotary member 113 may have a centerline axis of rotation in a first direction X and thus may direct particulates in the first direction X towards a second rotary member 113; the second rotary member 113 may also have a centerline axis of rotation in the first direction X and may, in turn, direct particulates (including those directed by and received from the first rotary member 113) in the first direction X towards a third rotary member 113; the third rotary member 113 may also have a centerline axis of rotation in the first direction X and may, in turn, direct particulates (including those directed by and received from the first and second rotary members 113) in the first direction X towards a fourth rotary member 113; and so on, until reaching a last rotary member 113, which may direct particulates towards the output section 108 (or one of the output sections when there are more than one output sections).

As another example, a first rotary member 113 may have a centerline axis of rotation in a first direction X and thus may direct particulates in a first direction X towards a second rotary member 113. The second rotary member 113 may have a centerline axis of rotation in a second direction Z different from the first direction X (such as at an angle of 90 degrees from the first direction X) and may, in turn, direct particulates (including those directed by and received from the first rotary member 113) in the second direction Z towards a third rotary member 113. In such an example, the first, second, and third rotary members 113 may not be in a straight line configuration. The third rotary member 113 may also have a centerline axis of rotation in the first direction X (or second direction Z, or third direction Z' different from the first X and second Z directions) and may, in turn, direct particulates towards a fourth rotary member 113; and so on, until reaching a last rotary member 113, which may direct the particulates towards the output section 108 (or one of the output sections when there are more than one output sections).

Figure 2A:
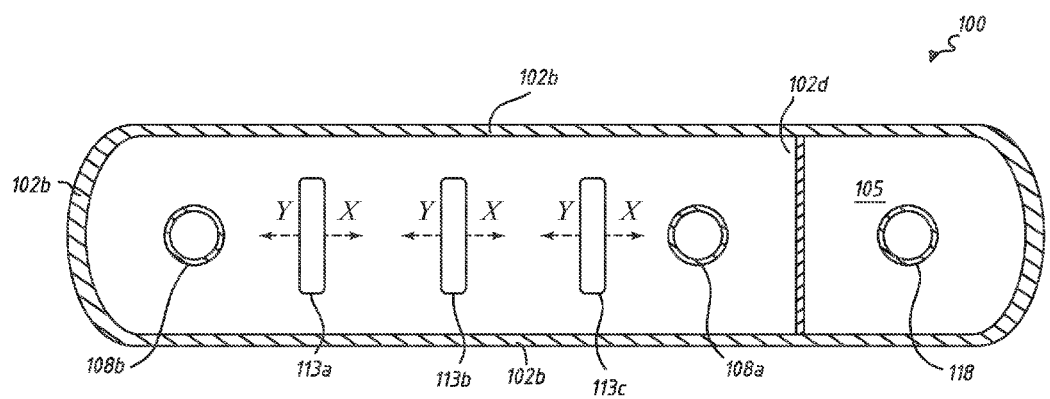
FIG. 2A is a top-view illustration of an example embodiment of a separator system with a configuration of rotary members being in a line configuration.

FIG. 2A illustrates an example embodiment of a separator system 100 having a compartment body 102 (and associated main interior cavity 104) that is cylindrical in shape and having output sections 108a and 108b provided on each end of the main interior cavity 104. In this example embodiment, the rotary members may be formed in a line. It is to be understood in the present disclosure that other shapes, sizes, and configurations are contemplated without departing from the scope of the present disclosure. A centerline axis of rotation of the first rotary member 113a may be in a first direction X, and the first rotary member 113a may be operable to direct particulates in the first direction X towards the second rotary member 113b (such as the direction depicted by the arrow X). Similarly, a centerline axis of rotation of the second rotary member 113b may be in the first direction X, and the second rotary member 113b may be operable to direct particulates present between the second rotary member 113b and the third rotary member 113c, including those particulates directed from the first rotary member 113a, in the first direction X towards a third rotary member 113c. A centerline axis of rotation of the third rotary member 113c may also be in the first direction X, and the third rotary member 113c may be operable to direct particulates present between the third rotary member 113c and the output section 108a, including particulates directed from the first 113a and second 113b rotary members, in the first direction X towards the output section 108a.

In example embodiments, the rotary members 113a, 113b, and 113c may also be operable to direct particulates in a second direction Y different from the first direction X (such as in a direction opposite to the first direction X). In doing so, example embodiments may be operable to direct particulates to the second output section 108b in a similar manner as described above for directing particulates in the first direction X towards the output section 108a.

Figure 2B:
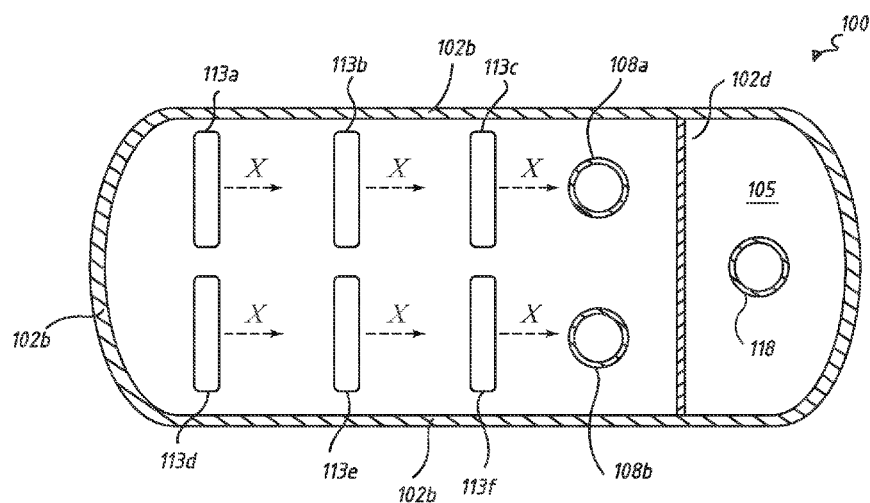
FIG. 2B is a top-view illustration of an example embodiment of a separator system with a configuration of rotary members being in a two line configuration.

FIG. 2B illustrates another example embodiment of a separator system 100 having a compartment body 102 that is cylindrical in shape and having two output sections 108a and 108b provided on one end of the cylindrically shaped compartment body 102. In this example embodiment, the rotary members may be formed in two lines. For the first line of rotary members comprising a first rotary member 113a, second rotary member 113b, and third rotary member 113c, a centerline axis of rotation of the first 113a, second 113b, and third 113c rotary members may be in a first direction (such as the direction depicted by the arrow X). The first rotary member 113a may be operable to direct particulates present between the first 113a and second 113b rotary members in the first direction towards the second rotary member 113b (and possibly towards the fifth rotary member 113e and other rotary members). The second rotary member 113b may be operable to direct particulates present between the second rotary member 113b and the third rotary member 113c, including particulates directed from the first rotary member 113a (and possibly particulates directed from the fourth 113d and fifth 113e rotary members and other rotary members), in the first direction towards the third rotary member 113c (and possibly towards the sixth rotary member 113f and other rotary members). The third rotary member 113c may be operable to direct particulates present between the third rotary member 113c and the output section 108a, including particulates directed from the first 113a and second 113b rotary members (and possibly particulates directed from the fifth 113e and sixth 113f rotary members and other rotary members), in the first direction towards the output section 108a (and possibly towards the second output section 108b and other rotary members).

For the second line of rotary members comprising a fourth rotary member 113d, fifth rotary member 113e, and sixth rotary member 113f, a centerline axis of rotation of the fourth 113d, fifth 113e, and sixth 113f rotary members may also be in a first direction. The fourth rotary member 113d may be operable to direct particulates present between the fourth 113d and fifth 113e rotary members in the first direction towards the fifth rotary member 113e (and possibly towards the second rotary member 113b and other rotary members). The fifth rotary member 113e may be operable to direct particulates present between the fifth rotary member 113e and the sixth rotary member 113f, including particulates directed from the fourth rotary member 113d (and possibly particulates directed from the first 113a and second 113b rotary members and other rotary members), in the first direction towards the sixth rotary member 113f (and possibly towards the third rotary member 113c and other rotary members). The sixth rotary member 113f may be operable to direct particulates present between the sixth rotary member 113f and the second output section 108b, including particulates directed from the fifth 113e and sixth 113f rotary members (and possibly particulates directed from the second 113b and third 113c rotary members and other rotary members), in the first direction towards the second output section 108b (and possibly towards the output section 108a and other rotary members).

It is to be understood in the present disclosure that the first and second line of rotary members may be in operation at the same time or different times (i.e., alternating), in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture; concentration of particulates present in the input mixture at a given time; amount of particulates removed or discharged from output section 108, etc.), and/or the like. It is also to be understood in the present disclosure that the first line of rotary members may be operable to direct particulates in a first direction and the second line of rotary members may be operable to direct particulates in a second direction different from the first direction based on, among other things, the locations of the first and second output sections.

Figure 2C:
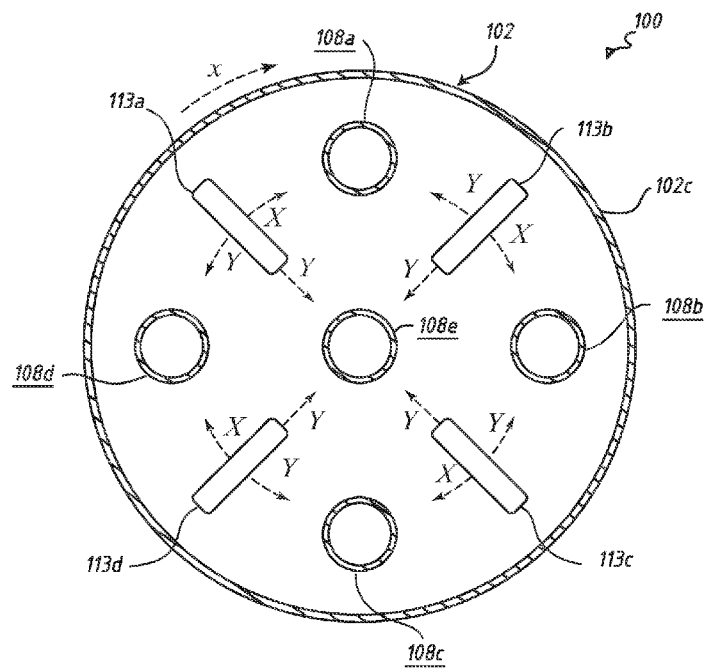
FIG. 2C is a top-view illustration of an example embodiment of a separator system with a configuration of rotary members being in a spread-out or circular configuration.

FIG. 2C illustrates another example embodiment of a separator system 100 having a compartment body 102 that is circular (or spherical or cylindrical) in shape and having four output sections 108a, 108b, 108c, and 108d provided on opposing sides of the compartment body 102 and a fifth output section 108e in a center portion of the interior cavity 104. In this example embodiment, the rotary members 113a, 113b, 113c, and 113d may be formed in a spread out array, that is, in one or more areas between the output sections 108a, 108b, 108c, and 108d. In this example embodiment, a centerline axis of rotation of the first 113a, second 113b, third 113c, and fourth 113d rotary members may be in a first direction (such as in the direction of arrow X, or in a clockwise direction). The first rotary member 113a may be operable to direct particulates in the first direction X towards the first output section 108a (and possibly to the second rotary member 113b, other rotary members, and the fifth output section 108e). The second rotary member 113b may be operable to direct particulates present between the second rotary member 113b and the second output section 108b, including particulates directed from the first rotary member 113a (and possibly from other rotary members), in the first direction X towards the second output section 108b (and possibly to the third rotary member 113c, other rotary members, and the fifth output section 108e). The third rotary member 113c may be operable to direct particulates present between the third rotary member 113c and the third output section 108c, including particulates directed from the second rotary member 113b (and possibly from other rotary members), in the first direction X towards the third output section 108c (and possibly to the fourth rotary member 113d, other rotary members, and the fifth output section 108e). The fourth rotary member 113d may be operable to direct particulates present between the fourth rotary member 113d and the fourth output section 108d, including particulates directed from the third rotary member 113c (and possibly from other rotary members), in the first direction X towards the fourth output section 108d (and possibly to the first rotary member 113a, other rotary members, and the fifth output section 108e).

It is to be understood in the present disclosure that the rotary members may be in operation at the same time or different times (i.e., alternating), in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture; concentration of particulates present in the input mixture at a given time; amount of particulates removed or discharged from output section; etc.), and/or the like. It is also to be understood in the present disclosure that the rotary members may be operable to direct particulates in different directions from one another.

It is also to be understood in the present disclosure that the rotary members may be operable to alternate between directing particulates in a first direction X and a second direction Y different (such as the direction depicted by the arrow Y) from a first direction X by alternating its direction of rotation, orientation, and the like. For example, all rotary members may be operable to direct particulates in the first direction X for a period of time by having a first direction of rotation. Thereafter, all rotary members may be operable to direct particulates in the second direction Y for another period of time by having a second direction of rotation different from the first direction of rotation.

Figure 2D:
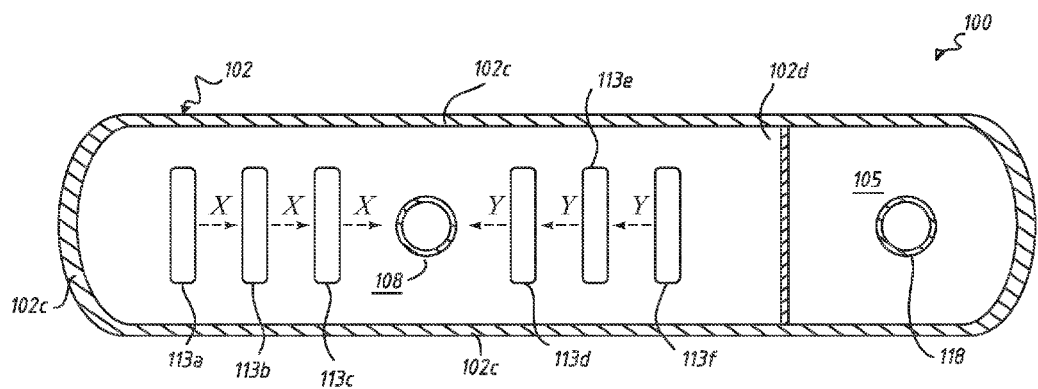
FIG. 2D is a top-view illustration of an example embodiment of a separator system with a configuration of rotary members being in a two line configuration and having an output section in a center portion of the interior cavity.

FIG. 2D illustrates another example embodiment of a separator system 100 having a compartment body 102 that is cylindrical in shape and having one output section 108 provided in the middle of the cylindrically shaped compartment body 102. In this example embodiment, the rotary members 113 may be formed in a first line on one side of the output section 108 and a second line on another side of the output section 108. For the first line of rotary members comprising a first rotary member 113a, second rotary member 113b, and third rotary member 113c, a centerline axis of rotation of the first 113a, second 113b, and third 113c rotary members may be in a first direction (such as the direction depicted by the arrow X). The first rotary member 113a may be operable to direct particulates in the first direction X towards the second rotary member 113b. The second rotary member 113b may be operable to direct particulates present between the second rotary member 113b and the third rotary member 113c, including particulates directed from the first rotary member 113a (and other rotary members), in the first direction X towards the third rotary member 113c. The third rotary member 113c may be operable to direct particulates present between the third rotary member 113c and the output section 108, including particulates directed from the first 113a and second 113b rotary members (and other rotary members), in the first direction X towards the output section 108.

For the second line of rotary members comprising a fourth rotary member 113d, fifth rotary member 113e, and sixth rotary member 113f, a centerline axis of rotation of the fourth 113d, fifth 113e, and sixth 113f rotary members may also be in a second direction Y different from the first direction X. The fourth rotary member 113d may be operable to direct particulates in the second direction Y towards the fifth rotary member 113e. The fifth rotary member 113e may be operable to direct particulates present between the fifth rotary member 113e and the sixth rotary member 113f, including particulates directed from the fourth rotary member 113d (and other rotary members), in the second direction Y towards the sixth rotary member 113f. The sixth rotary member 113f may be operable to direct particulates present between the sixth rotary member 113f and the output section 108, including particulates directed from the fifth 113e and sixth 113f rotary members (and other rotary members), in the second direction Y towards the output section 108.

It is to be understood in the present disclosure that the first and second line of rotary members may be in operation at the same time or different times (i.e., alternating), in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture; concentration of particulates present in the input mixture at a given time; amount of particulates removed or discharged from output section; etc.), and/or the like.

It is to be understood in the present disclosure that other shapes of the compartment body 102 and other configurations of the rotary members 113 can be provided for the separator system 100 and associated disturbance assembly 112, including combinations of simple configurations (such as those described above and herein), without departing from the scope of the present disclosure.

In example embodiments, one or more of the rotary members 113 may be operable to rotate in a first rotary direction X and a second rotary direction Y different from (or opposite to) the first rotary direction X. In example embodiments, the rotation speed and/or duration of each rotary member 113 in the first rotary direction X may be controllable and selectable. In example embodiments, the rotation speed and/or duration of each rotation member 113 in the second rotary direction Y may be controllable and selectable. In some example embodiments, most or all of the rotary members 113 may be operable to rotate in the first rotary direction X and the second rotary direction Y, and corresponding rotation speeds and durations may be controllable and selectable. It is recognized in the present disclosure that, when an input mixture is housed in the interior cavity 104, each rotary member 113 may be operable to direct components of the input mixture, such as particulates, in a first direction X when the rotary member 113 rotates in the first rotary direction. Furthermore, each rotary member 113 may be operable to direct components of the input mixture, such as particulates, in a second direction Y different from the first direction X when the rotary member 113 rotates in the second rotary direction. For example, the first direction X may be a direction opposite to the second direction Y.

Figure 3A:
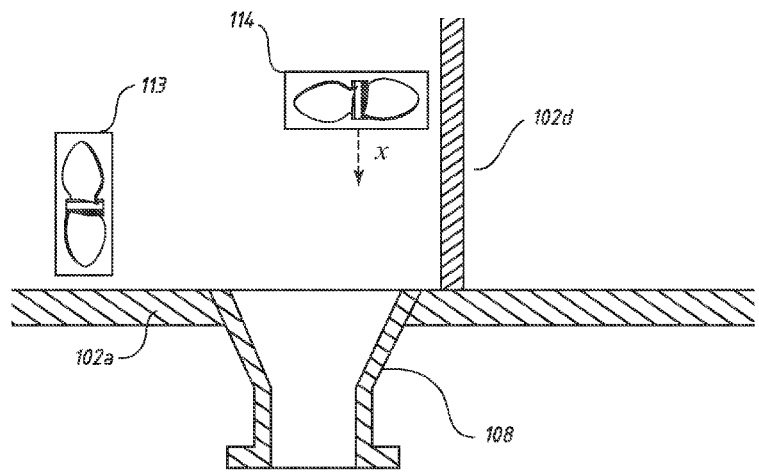
FIG. 3A is an illustration of a centerline axis of rotation of a discharge assembly.

The separator system 100 may further comprise a discharge assembly 114 fixedly secured to the compartment body 102 and arranged proximate to the output section 108 (or one of the output sections when there are more than one output sections). The discharge assembly 114 may be configured so as to encourage particulates of the input mixture present in the interior cavity 104 to pass through the output section 108. In example embodiments, the discharge assembly 114 may be similar to or identical to a rotary member 113 of the disturbance assembly 112. For example, the discharge assembly 114 may resemble a propeller, fan, turbine, or the like, and may have one or more than one elongated member, such as a vane or blade, as the rotating member of the discharge assembly 114 that rotates about or around a centerline axis of rotation. An example centerline axis of rotation of a discharge assembly 114 is illustrated in FIG. 3A.

The discharge assembly 114 may be positioned in such a way that a centerline axis of rotation of the discharge assembly 114 is directed into the output section 108 (or one of the output sections when there are more than one output sections). In example embodiments, a position and orientation (i.e., centerline axis of rotation), as well as the rotation, of the discharge assembly 114 may be controllable and selectable, either in a continuous manner, intermittent manner, scheduled manner, on-demand manner, random manner, and/or the like, as well as in response to a measurement reading or detection (such as by a sensor (not shown), or the like), time duration, feedback response, comparative analysis (such as concentration of particulates of initial input mixture; concentration of particulates present in the input mixture at a given time; amount of particulates removed or discharged from output section; etc.), and/or the like. In example embodiments, the discharge assembly 114 may comprise two or more than two vanes or blades.

Figure 3B:
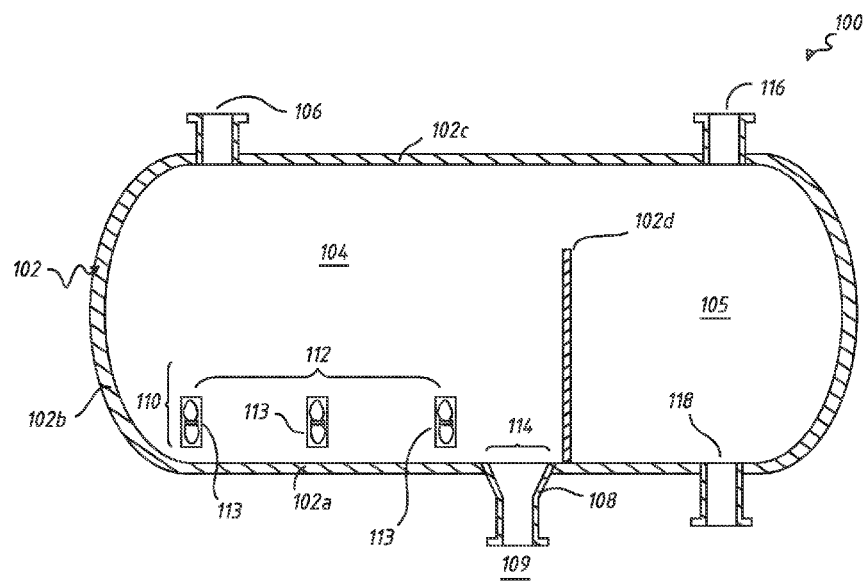
FIG. 3B is a cross-sectional illustration of an example embodiment of a separator system with a discharge assembly being in a static structured configuration.

In other example embodiments, the rotating members of the discharge assembly 114 may be replaced with or complimented by a static structural formation, such as a funnel-shaped or declining-shaped feature operable to encourage particulates present nearby to enter into the output section 108. FIG. 3B illustrates an example embodiment of a static structured discharge assembly 114.

The separator system 100 may further comprise a controller (not shown) operable to control, select, and/or allow operators to control and select, among other things, rotary direction and speed of one or more of the rotary members 113 of the disturbance assembly 112. The controller may also be operable to control, select, and/or allow operators to control and select, among other things, orientation of one or more of the rotary members 113 of the disturbance assembly 112. The controller may also be operable to control, select, and/or allow operators to control and select, among other things, how the rotary members 113 collectively operate (i.e., configuration of the rotary members 113). The controller may also be operable to control, select, and/or allow operators to control and select, among other things, whether one, some, or all of the rotary members 113 operate in a continuous manner, intermittent manner, scheduled manner, on-demand manner, random manner, and/or the like, as well as in response to a measurement reading or detection (such as by a sensor, or the like), time duration, feedback response, comparative analysis (such as concentration of particulates of initial input mixture; concentration of particulates present in the input mixture at a given time; amount of particulates removed or discharged from output section; etc.), and/or the like. The controller may also be operable to control, select, and/or allow operators to control and select, among other things, how and when the discharge assembly 114 operates. For example, the controller may be operable to control, select, and/or allow operators to control and select the rotary direction, speed, and/or orientation of the discharge assembly 114.

As used in the present disclosure, a controller may be a computing device, mobile computing device, processor, server, client, node, instance, host, or machine in a networked computing environment. Examples include digital signal processors (DSPs), application-specific integrated circuits (ASICs), field-programmable gate arrays (FPGAs), and any other suitable specific or general purpose processors.

The controller may be operable to communicate with other controllers, a computing device operated by an operator, a network, and/or other components (such as sensors or detectors, as described below) via wired or wireless communications, and such communications may be provided over one or more networks. A network or cloud may be a collection of machines connected by communication channels that facilitate communications between machines and allow for machines to share resources. Network may also refer to a communication medium between processes on the same machine.

The separator system 100 may further comprise one or more detectors or sensors (not shown) for detecting, among other things, a suspension height of particulates in the input mixture present in the interior cavity 104, concentration of particulates in the input mixture, concentration of particulates present in the input mixture at a given time, etc. As a suspension height of particulates in the input mixture may change with time and based on operations of the particulate-directing subsystem 110, the one or more detectors or sensors may be operable to perform detecting of suspension heights of particulates in one or more areas in a continuous manner, intermittent manner, scheduled manner, on-demand manner, random manner, and/or the like, as well as in response to a previous measurement reading or detection (such as an average, mean, maximum, minimum, etc.), etc.

In example embodiments, the controller may be operable to control, among other things, the suspension height of the particulates (such as an average, maximum, minimum, etc.), concentration of particulates, etc., by controlling, among other things, the rotary direction and/or speed of one or more rotary members 113, orientation of one or more rotary members 113, how the rotary members 113 collectively operate (i.e., configuration of the rotary members), how the discharge assembly 114 operates, how the sensors or detectors operate, and whether the rotary members 113 and/or discharge members 114 operate in a continuous manner, intermittent manner, scheduled manner, on-demand manner, random manner, and/or the like, as well as in response to a measurement reading or detection (such as by a sensor, or the like), time duration, feedback response, comparative analysis (such as concentration of particulates of initial input mixture; concentration of particulates present in the input mixture at a given time; amount of particulates removed or discharged from the output section, etc.), and/or the like.

The controller may comprise memory (or storage or database) for storing any suitable information, such as rotary direction and speed of one or more of the rotary members 113 of the disturbance assembly 112, how the rotary members 113 collectively operate (i.e., configuration of the rotary members 113), how and when the discharge assembly 114 operates, and how to control suspension height of particulates in the interior cavity 104.

Memory (or storage or database) may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, "assembly," "apparatus," "portion," "segment," "member," "body," "section," "subsystem," "system," or other similar terms should generally be construed broadly to include one part or more than one part attached or connected together.

Various terms used herein have special meanings within the present technical field. Whether a particular term should be construed as such a "term of art" depends on the context in which that term is used. For example, "connect," "connected," "connecting," "connectable," "attach," "attached," "attaching," "attachable," "secure," "secured," "securing," "securable," "lock," "locked," "locking," "lockable," "anchor," "anchored," "anchoring," "anchorable," "install," "installed," "installing," "installable," "couple," "coupled," "coupling," "in communication with," "communicating with," "associated with," "associating with," or other similar terms should generally be construed broadly to include situations where attachments, connections, installations, and anchoring are direct between referenced elements or through one or more intermediaries between the referenced elements. As another example, "un-connect," "un-connected," "un-connecting," "un-connectable," "un-attach," "un-attached," "un-attaching," "un-attachable," "un-secure," "un-secured," "un-securing," "un-securable," "unlock," "unlocked," "unlocking," "unlockable," "un-anchor," "un-anchored," "un-anchoring," "un-anchorable," "uninstall," "uninstalled," "uninstalling," "uninstallable," "uncouple," "uncoupled," "uncoupling," or other similar terms should generally be construed broadly to include situations where separation, removal, and detaching are direct between referenced elements or from one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during,"

"substantially complete," etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A separator system for receiving an input mixture and separating particulates from the input mixture, the separator system comprising:
   a compartment body defining an interior cavity, the interior cavity formed by interior walls of the compartment body;
   an input section formed in the compartment body, the input section operable to receive an input mixture for housing in the interior cavity;
   an output section formed in the compartment body; and
   a particulate-directing subsystem provided in the interior cavity, the particulate-directing subsystem having:
      a disturbance assembly fixedly secured to the compartment body and arranged along at least a bottom portion of the interior cavity, the disturbance assembly having at least one rotary member operable to rotate in a first rotary direction and a second rotary direction opposite to the first rotary direction; and
      a discharge assembly fixedly secured to the compartment body and arranged proximate to the output section, the discharge assembly configured so as to encourage particulates of the input mixture present in the interior cavity to pass through the output section.

2. The separator system of claim 1, wherein the disturbance assembly is operable to direct particulates of the input mixture present in the interior cavity in a first direction when the at least one rotary member rotates in the first rotary direction, and wherein the disturbance assembly is operable to direct particulates of the input mixture present in the interior cavity in a second direction different from the first direction when the at least one rotary member rotates in the second rotary direction.

3. The separator system of claim 1, wherein the disturbance assembly comprises an array of rotary members, and wherein at least one of the rotary members is positioned in such a way that a centerline axis of rotation of the rotary member is directed towards the output section, and wherein at least one of the rotary members is positioned in such a way that a centerline axis of rotation of the rotary member is directed towards another one of the rotary members.

4. The separator system of claim 1, further comprising a second output section.

5. The separator system of claim 4, wherein the output section and the second output section are formed on opposing sides of the interior cavity, and wherein at least one rotary member is provided in an area of the interior cavity between the output section and the second output section in such a way that a centerline axis of rotation of the at least one rotary member is directed towards both the output section and the second output section.

6. The separator system of claim 4, wherein at least one rotary member is provided in such a way that a centerline axis of rotation of the at least one rotary member is directed towards the output section, and wherein at least a second rotary member is provided in such a way that a centerline axis of rotation of the at least second rotary member is directed towards the second output section.

7. The separator system of claim 1, wherein a centerline axis of rotation of the at least one rotary member is adjustably controllable.

8. The separator system of claim 1, wherein the discharge assembly comprises one or more rotation members, each of the rotation members of the discharge assembly having a centerline axis of rotation directed towards the output section.

9. The separator system of claim 1, wherein the particulate-directing subsystem further comprises a controller operable to control rotary direction and speed of the at least one rotary member;
   wherein the particulate-directing subsystem further comprises a detector for detecting a suspension height of the particulate present in the input mixture; and
   wherein the controller is operable to control the suspension height of the particulate by controlling the rotary direction and/or speed of the at least one rotary member.

10. A particulate-directing subsystem for use in a separator system, the separator system having a compartment body, an input section, and an output section, wherein the compartment body defines an interior cavity for housing an input mixture, wherein the input section is formed in the compartment body and operable to receive the input mixture into the interior cavity, and wherein the output section is formed in the compartment body and operable to separate particulates from the input mixture, the particulate-directing subsystem comprising:
   a disturbance assembly provided in a bottom portion of the interior cavity and fixedly secured to the compartment body, the disturbance assembly having at least one rotary member operable to rotate in a first rotary direction and a second rotary direction opposite to the first rotary direction; and
   a discharge assembly fixedly secured to the compartment body and arranged proximate to the output section, the discharge assembly configured so as to encourage particulates of the input mixture present in the interior cavity to pass through the output section.

11. The particulate-directing subsystem of claim 10, wherein the disturbance assembly is operable to direct particulates of the input mixture present in the interior cavity in a first direction when the at least one rotary member rotates in the first rotary direction, and wherein the disturbance assembly is operable to direct particulates of the input mixture present in the interior cavity in a second direction different from the first direction when the at least one rotary member rotates in the second rotary direction.

12. The particulate-directing subsystem of claim 10, wherein the disturbance assembly comprises an array of rotary members, wherein at least one of the rotary members is positioned in such a way that a centerline axis of rotation of the rotary member is directed towards the output section, and wherein at least one of the rotary members is positioned in such a way that a centerline axis of rotation of the rotary member is directed towards another one of the rotary members.

13. The particulate-directing subsystem of claim 10, wherein the separator system further comprising a second output section.

14. The particulate-directing subsystem of claim 13, wherein the output section and the second output section are formed on opposing sides of the interior cavity, and wherein at least one rotary member is provided in an area of the interior cavity between the output section and the second output section in such a way that a centerline axis of rotation of the at least one rotary member is directed towards both the output section and the second output section.

15. The particulate-directing subsystem of claim 13, wherein at least one rotary member is provided in such a way that a centerline axis of rotation of the at least one rotary member is directed towards the output section, and wherein at least a second rotary member is provided in such a way that a centerline axis of rotation of the at least second rotary member is directed towards the second output section.

16. The particulate-directing subsystem of claim 10, wherein a centerline axis of rotation of the at least one rotary member is adjustably controllable.

17. The particulate-directing subsystem of claim 10, wherein the discharge assembly comprises one or more rotation members, each of the rotation members of the discharge assembly having a centerline axis of rotation directed towards the output section.

18. The particulate-directing subsystem of claim 10, further comprising a controller operable to control rotary direction and speed of the at least one rotary member and a detector for detecting a suspension height of particulates in the input mixture present in the interior cavity, wherein the controller is operable to control the suspension height of the particulate by controlling the rotary direction and/or speed of the at least one rotary member.

19. A particulate-directing subsystem for use in a separator system, the separator system having a compartment body, an input section, and an output section, wherein the compartment body defines an interior cavity for housing an input mixture, wherein the input section is formed in the compartment body and operable to receive the input mixture into the interior cavity, and wherein the output section is formed in the compartment body and operable to separate particulates from the input mixture, the particulate-directing subsystem comprising:
    a disturbance assembly provided in a bottom portion of the interior cavity and fixedly secured to the compartment body, the disturbance assembly having at least one rotary member operable to rotate in a first rotary direction;
    a controller operable to control a speed of the at least one rotary member of the disturbance assembly; and
    a detector for detecting a suspension height of particulates in the input mixture present in the interior cavity;
    wherein the controller is operable to control the suspension height of the particulates by controlling the speed of the at least one rotary member.

20. The particulate-directing subsystem of claim 19, wherein the at least one rotary member is further operable to rotate in a second rotary direction, wherein the controller is operable to control a rotary direction of the at least one rotary member, and wherein the controller is operable to control the suspension height of the particulates by controlling the rotary direction of the at least one rotary member.

21. The particulate-directing subsystem of claim 20, wherein the disturbance assembly is operable to direct particulates of the input mixture present in the interior cavity in a first direction when the at least one rotary member rotates in the first rotary direction, and wherein the disturbance assembly is operable to direct particulates of the input mixture present in the interior cavity in a second direction different from the first direction when the at least one rotary member rotates in the second rotary direction.

22. The particulate-directing subsystem of claim 20, wherein the separator system further comprising a second output section.

23. The particulate-directing subsystem of claim 22, wherein the output section and the second output section are formed on opposing sides of the interior cavity, and wherein at least one rotary member is provided in an area of the interior cavity between the output section and the second output section in such a way that a centerline axis of rotation of the at least one rotary member is directed towards both the output section and the second output section.

24. The particulate-directing subsystem of claim 22, wherein at least one rotary member is provided in such a way that a centerline axis of rotation of the at least one rotary member is directed towards the output section, and wherein at least a second rotary member is provided in such a way that a centerline axis of rotation of the at least second rotary member is directed towards the second output section.

25. The particulate-directing subsystem of claim 19, further comprising a discharge assembly fixedly secured to the compartment body and arranged proximate to the output section, the discharge assembly configured so as to encourage particulates of the input mixture present in the interior cavity to pass through the output section.

26. The particulate-directing subsystem of claim 25, wherein the discharge assembly comprises one or more rotation members, each of the rotation members of the discharge assembly having a centerline axis of rotation directed towards the output section.

27. The particulate-directing subsystem of claim 19, wherein the disturbance assembly comprises an array of rotary members, wherein at least one of the rotary members is positioned in such a way that a centerline axis of rotation of the rotary member is directed towards the output section, and wherein at least one of the rotary members is positioned in such a way that a centerline axis of rotation of the rotary member is directed towards another one of the rotary members.

28. The particulate-directing subsystem of claim 19, wherein a centerline axis of rotation of the at least one rotary member is adjustably controllable.

* * * * *